US00RE45724E

(19) United States
(12) Reissued Patent
Dueck

(10) Patent Number: US RE45,724 E
(45) Date of Reissued Patent: Oct. 6, 2015

(54) CANTILEVERED AND OFF-SET WEAPON SIGHTS

(71) Applicant: Barry W. Dueck, Huntington Beach, CA (US)

(72) Inventor: Barry W. Dueck, Huntington Beach, CA (US)

(21) Appl. No.: 14/341,469

(22) Filed: Jul. 25, 2014

Related U.S. Patent Documents

Reissue of:

(64) Patent No.: 8,490,315
Issued: Jul. 23, 2013
Appl. No.: 13/136,226
Filed: Jul. 26, 2011

(51) Int. Cl.
*F41G 1/00* (2006.01)
*F41G 1/02* (2006.01)
*F41G 1/387* (2006.01)

(52) U.S. Cl.
CPC . *F41G 1/02* (2013.01); *F41G 1/387* (2013.01)

(58) Field of Classification Search
CPC ..... F41G 1/02; F41G 1/26; F41G 11/003; F41G 1/24; F41G 1/387
USPC ..... 42/111, 124, 126, 137, 139, 141, 148, 42/140, 127
See application file for complete search history.

(56) References Cited

U.S. PATENT DOCUMENTS

| | | | | | |
|---|---|---|---|---|---|
| 1,000,145 | A * | 8/1911 | Bennett | 42/124 |
| 2,367,762 | A * | 1/1945 | Olsen | 42/148 |
| 3,961,423 | A * | 6/1976 | Hrebar | 42/137 |
| 4,021,926 | A * | 5/1977 | Hrebar | 42/137 |
| 4,962,589 | A * | 10/1990 | LaRosa | 42/137 |
| 5,340,115 | A * | 8/1994 | Shirai et al. | 463/5 |
| 5,606,818 | A * | 3/1997 | Hardee | 42/124 |
| 5,941,006 | A * | 8/1999 | Horton | 42/124 |
| 6,598,331 | B1 * | 7/2003 | Thibodeaux | 42/111 |
| 6,722,075 | B1 * | 4/2004 | Gabaldon | 42/141 |
| 2003/0140546 | A1 * | 7/2003 | Kay | 42/133 |
| 2004/0000083 | A1 * | 1/2004 | Grant, Jr. | 42/112 |
| 2006/0005450 | A1 * | 1/2006 | Nesseth et al. | 42/140 |
| 2008/0092423 | A1 * | 4/2008 | Keng | 42/111 |

* cited by examiner

*Primary Examiner* — William Doerrler
(74) *Attorney, Agent, or Firm* — R. Tracy Crump

(57) ABSTRACT

The weapon sights can be used simultaneously in conjunction with another optical sight and can be mounted on the same weapon accessory rail as the other optical sight. The weapon sights include a front sight and a rear sight that detachably mount to the weapon's accessory rail, but are cantilevered and off-set so that they do not interfere with the optical sight mounted to the same accessory rail. The cantilevered configuration and off-set orientation of the rear sight assembly and the front sight post also allow the shooter to transition quickly between the weapon sight of this invention and an optical sight by simply canting the weapon 45 degrees to bring the desired sight on target and into the vertical of the weapon.

28 Claims, 9 Drawing Sheets

CANTILEVERED AND OFF-SET WEAPON SIGHTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a continuation of U.S. patent application Ser. No. 29/349,453 filed on Apr. 2, 2010 now U.S. Pat. No. D,647,158.

This invention relates to sights for firearms and in particular off-set weapon sights mounted to weapon accessory rails.

BACKGROUND AND SUMMARY OF THE INVENTION

Combatants may be required to use rifles to engage threats at varying ranges. Often, combatants prefer separate rifle sighting systems for threats at varying ranges. For AR-15/M16 style weapons and other types of assault rifles, optical sights generally provide superior performance at longer ranges (beyond 200 meters), but traditional iron sights can be more effective for close-range engagements (inside 200 meters). However, attaching a telescopic optical sight can prevent the use of iron sights. If an optical sight fails at a critical moment, the sight may need to be physically removed from the weapon in order to use the back up sight. Even if the optical sight and the backup iron sights are mounted to the weapon in a co-witnessed alignment, the setup often causes a front sight "shadow" on the optical image. The addition of an optical sight also may present problematic transitions from telescopic optical sights to traditional iron sights.

The weapon sights of the present invention can be used simultaneously in conjunction with another optical sight and can be mounted on the same weapon accessory rail as the other optical sight. The weapon sights of this invention eliminate the cluttered or blocked field of vision of telescopic optical sights. The weapon sights of this invention include a front sight and a rear sight that mount to the weapon's accessory rail, but are cantilevered and off-set so that they do not interfere with the primary optical sight mounted to the same accessory rail. The cantilevered configuration and off-set orientation of the rear sight assembly and the front sight post also allows the shooter to transition quickly between the weapon sight of this invention and an optical sight by simply canting the weapon 45 degrees to bring the desired sight on target and into the vertical of the weapon. Using the off-set sights of this invention in conjunction with a traditional optical sight allows a shooter to engage targets at longer ranges using the primary optical sights, then quickly transition to engage targets at closer ranges using off-set iron sights.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
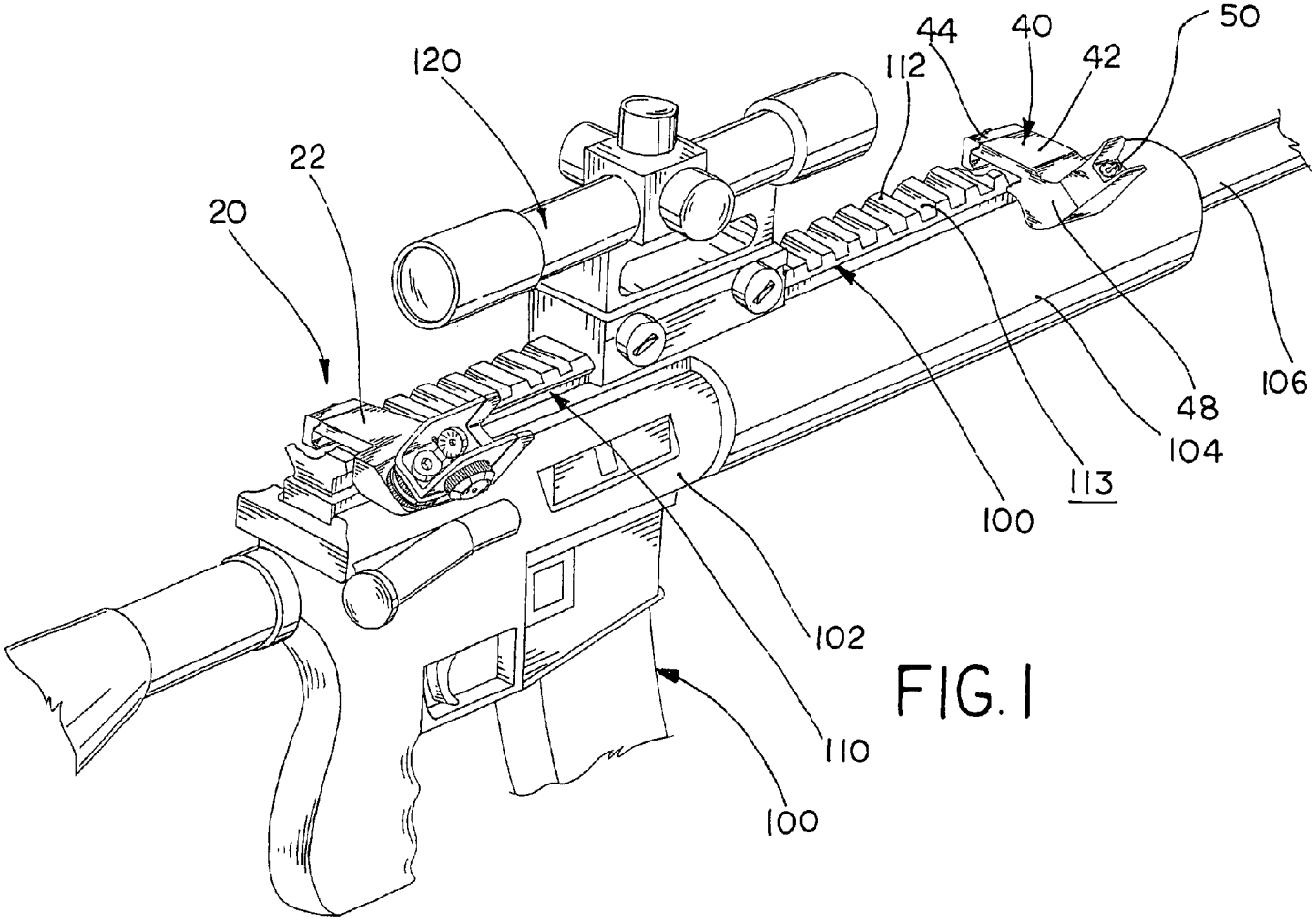
FIG. 1 is a perspective view of an embodiment of the weapon sights of this invention mounted to the accessory rail of an M16/M4 style weapon.
Figure 2:
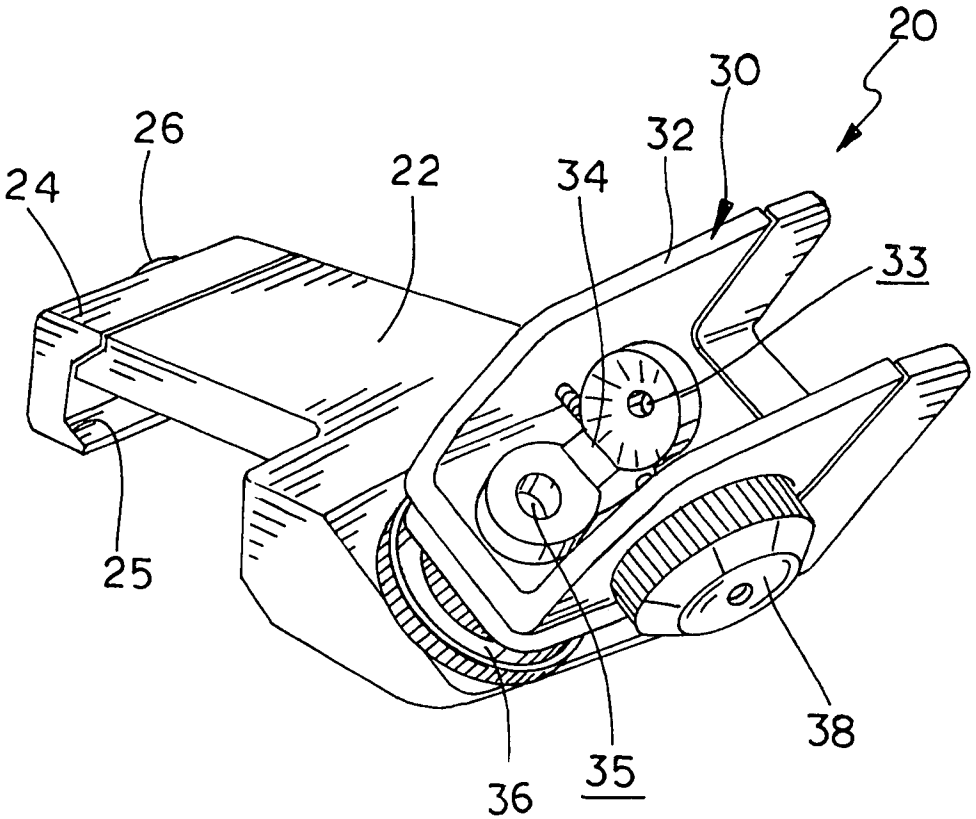
FIG. 2 is a perspective view of the rear sight of the weapon sights of FIG. 1.
Figure 4:
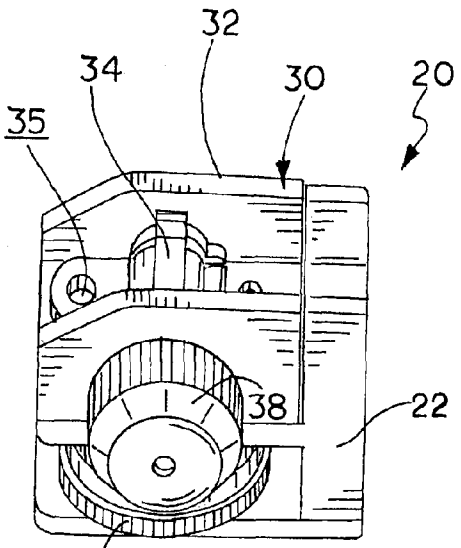
FIG. 4 is a right side view of the rear sight of the weapon sights of FIG. 1.
Figure 3:
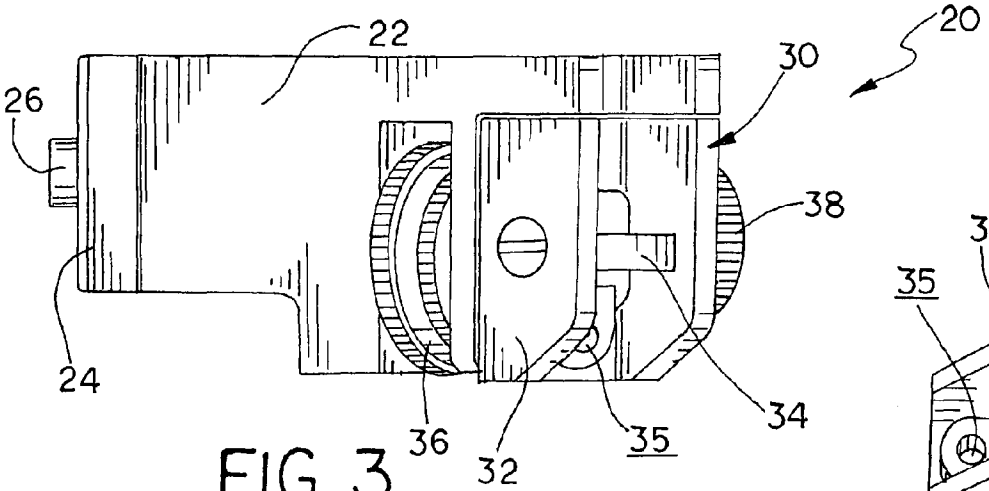
FIG. 3 is a top view of the rear sight of the weapon sights of FIG. 1.
Figure 5:
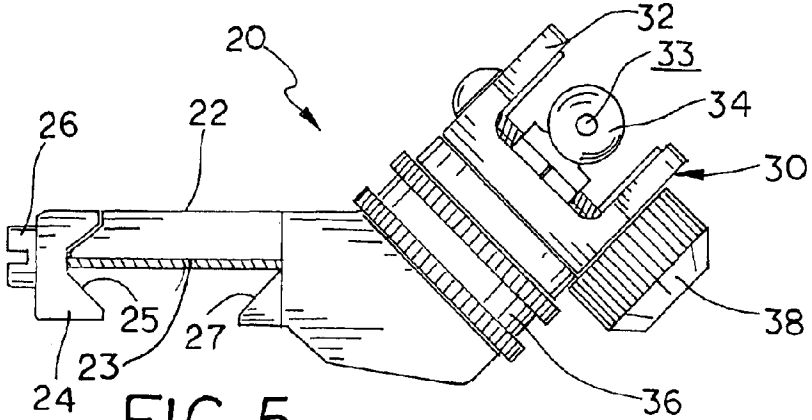
FIG. 5 is a rear view of the rear sight of the weapon sights of FIG. 1.
Figure 7:
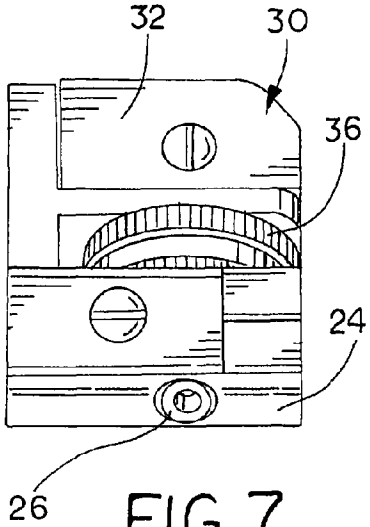
FIG. 7 is a left side view of the rear sight of the weapon sights of FIG. 1.
Figure 6:
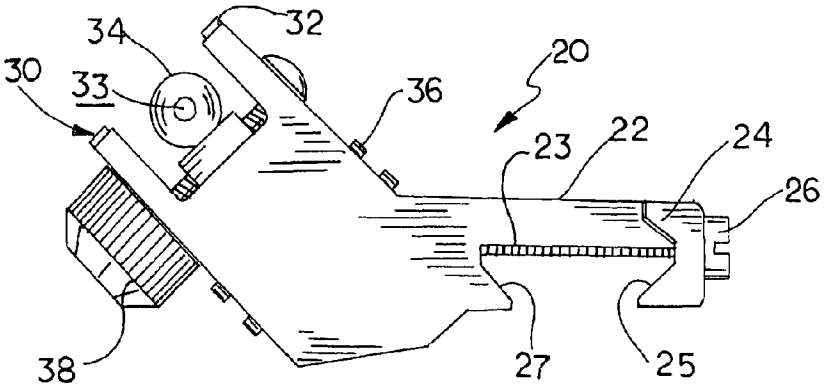
FIG. 6 is a front view of the rear sight of the weapon sights of FIG. 1.
Figure 8:
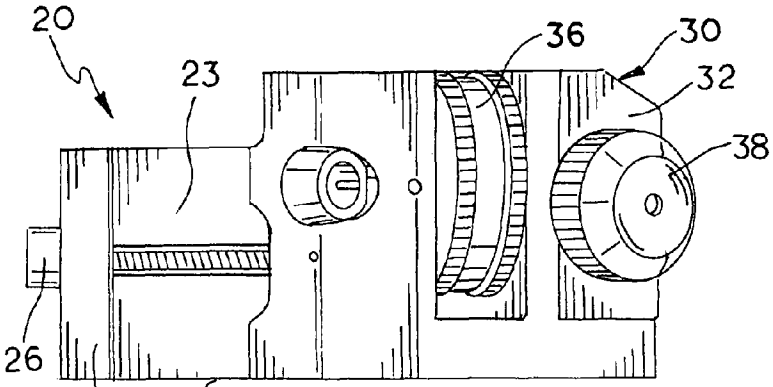
FIG. 8 is a bottom view of the rear sight of the weapon sights of FIG. 1.
Figure 9:
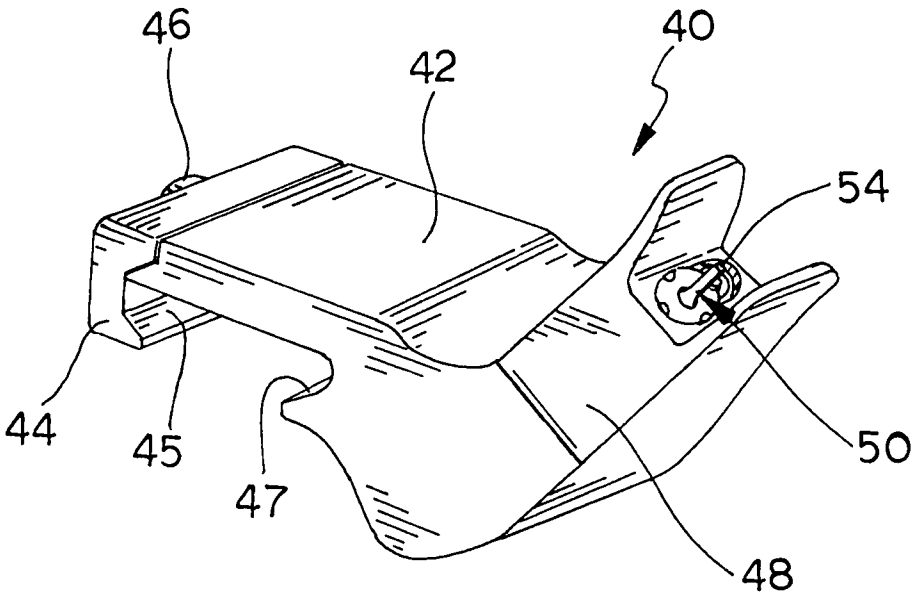
FIG. 9 is a perspective view of the front sight of the weapon sights of FIG. 1.
Figure 11:
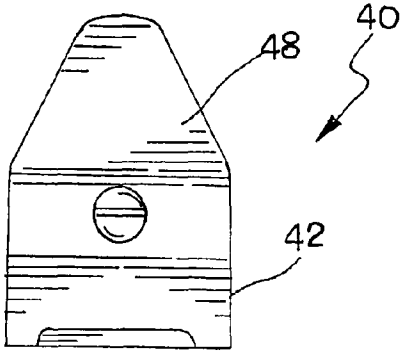
FIG. 11 is a left side view of the front sight of the weapon sights of FIG. 1.
Figure 10:
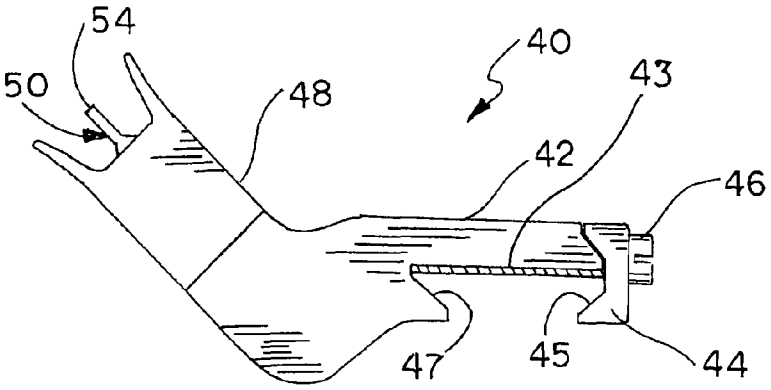
FIG. 10 is a front view of the front sight of the weapon sights of FIG. 1.
Figure 12:
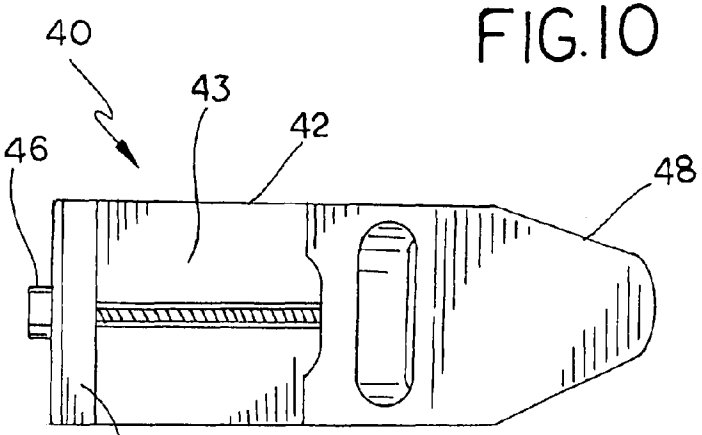
FIG. 12 is a bottom view of the front sight of the weapon sights of FIG. 1.
Figure 14:
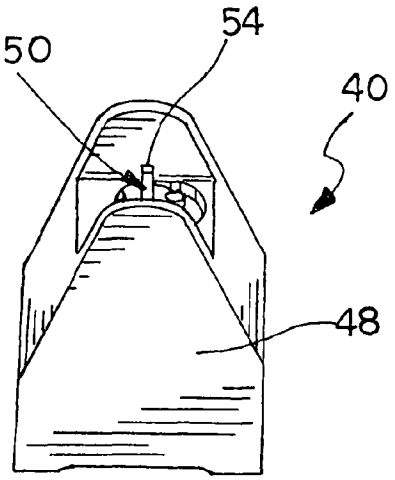
FIG. 14 is a right side view of the front sight of the weapon sights of FIG. 1.
Figure 13:
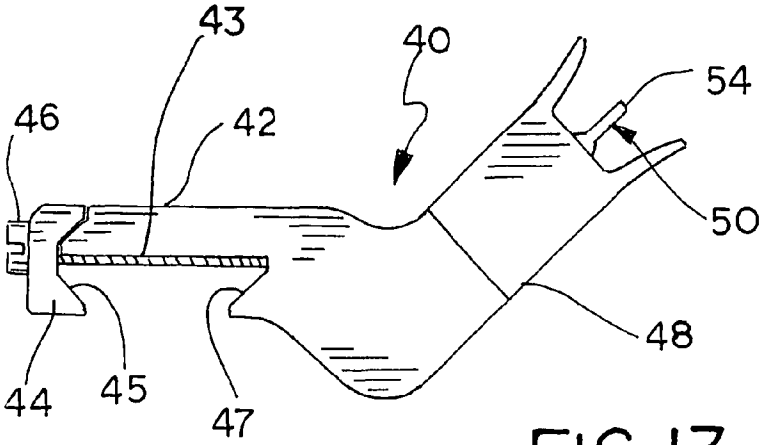
FIG. 13 is a rear view of the front sight of the weapon sights of FIG. 1.
Figure 15:
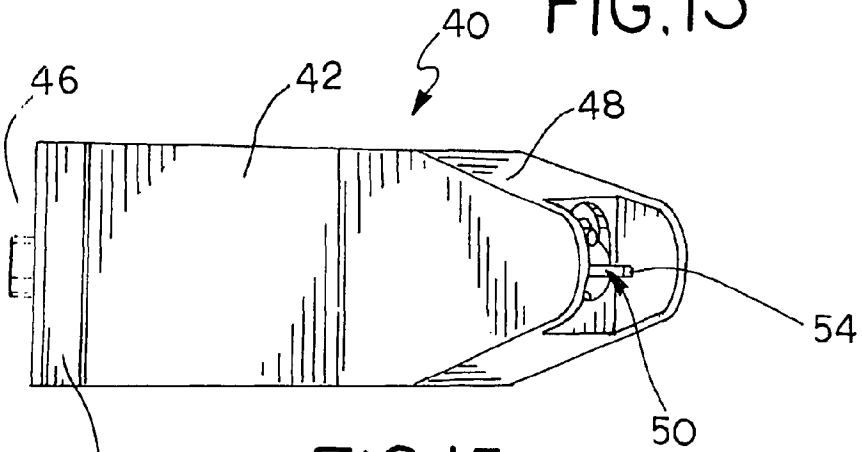
FIG. 15 is a top view of the front sight of the weapon sights of FIG. 1.

Referring to drawings, FIGS. 1-17 illustrate an embodiment of the off-set weapon sights of this invention, which include a front sight 20 and a rear sight 40. Front sight 20 and rear sight 40 are collectively designated and referred to as weapon sights 10. As shown in FIG. 1, weapon sights 10 are mountable to accessory rail 110 that extends along the top of the receiver 102 and forward hand guard 104 at the twelve o'clock position. A conventional telescopic optical sight 120 is also mounted to weapon accessory rail 110 between rear sight 20 and front sight 40.

For simplicity of illustration and explanation only, weapon sights 10 and optical sight 120 are illustrated mounted to the accessory rail 110 of a conventional M16/M4 style assault rifle 100; however, it should be understood that the teachings of this invention may be used with any rifle or shoulder fired weapon system within the teachings of this invention. In addition, it should be noted that weapon sights 10 may be adapted to mount to any type or style of accessory rail or mounting system. Alternatively, weapon sights 10 may be modified and adapted to mount directly to the weapon as desired within the teachings of this invention. Accessory rail 110 is illustrated as a Picatinny rail (United States Military standard MIL-STD-1913), which is commonly used on military style firearms for attaching optical scopes, thermal or laser sights, tactical flashlights, vertical hand grips or other weapon oriented accessories. Rail 110 includes an elongated flat rail body having a series of mounting projections 112 with evenly spaced transverse slots 113 therebetween to provide for selective location of the various accessories. Each of the mounting projections 112 has a flat top mounting surface and opposite transverse edges that are beveled to form a "dove tail" cross sectional profile with proximal (top) inclined surfaces, which are generally outward facing, and distal (bottom) inclined surfaces which are inward facing.

Figure 16:
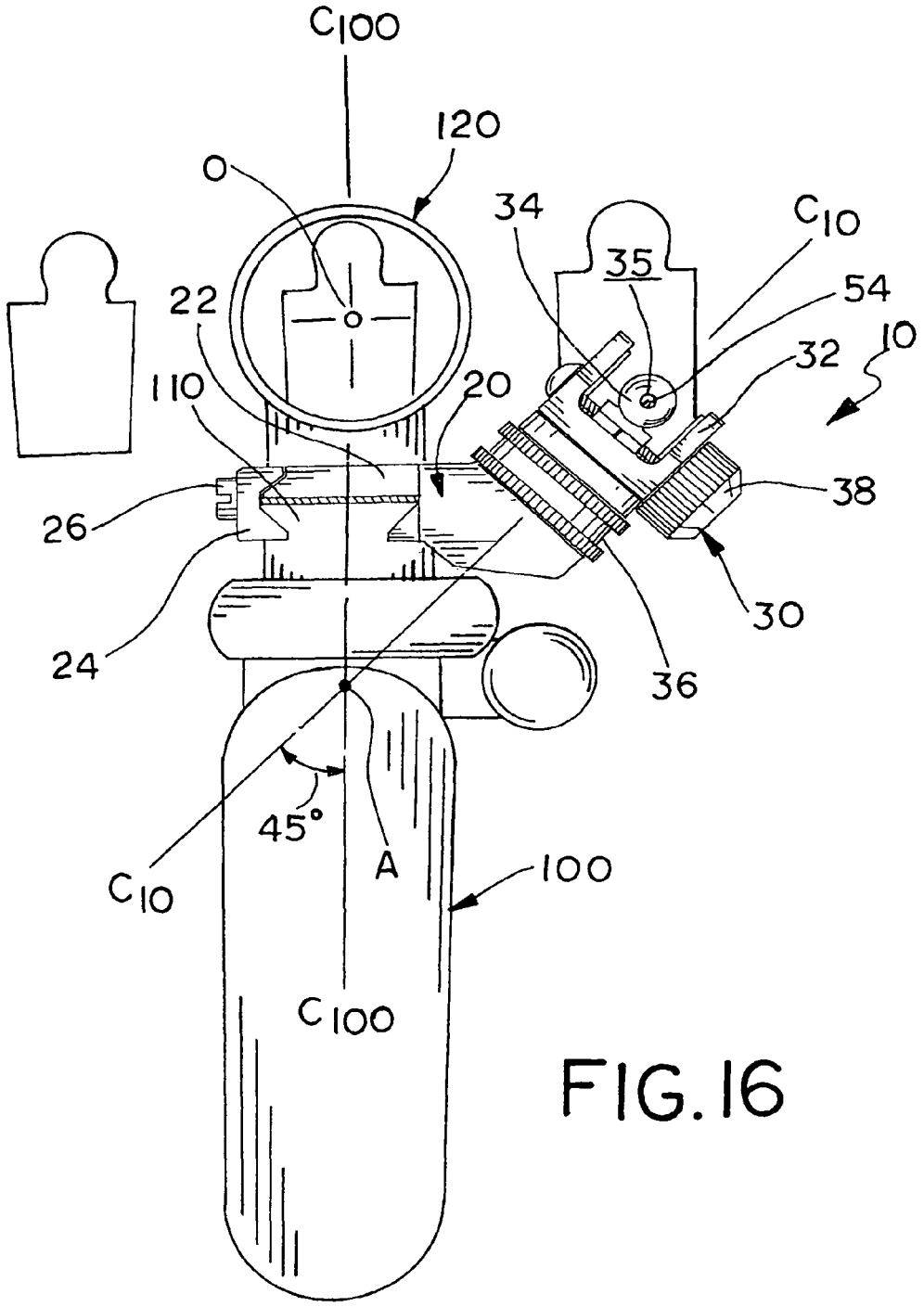
FIG. 16 is a rear view of the weapon sights and rifle of FIG. 1 showing the optical sight on target.
Figure 17:
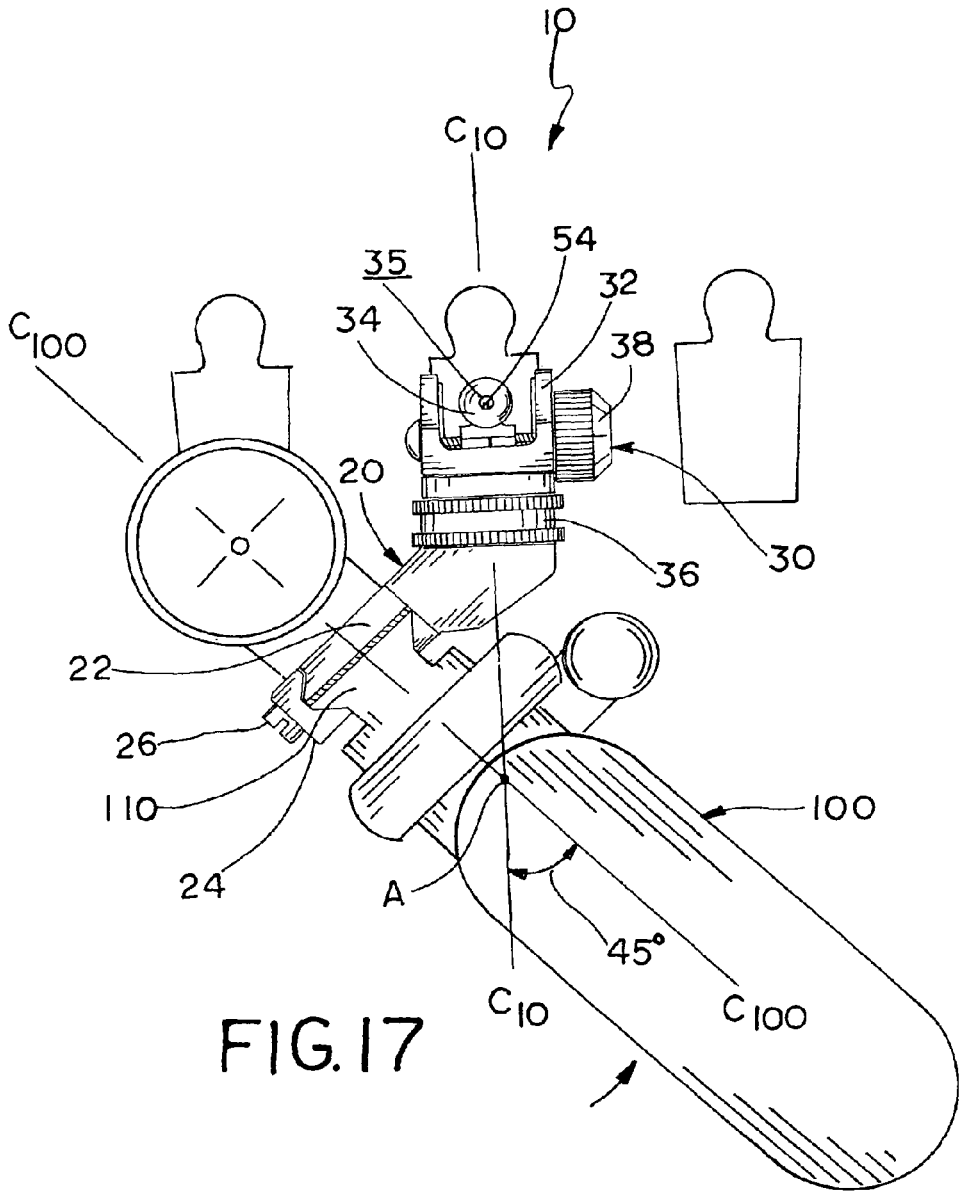
FIG. 17 is a rear view of the weapon sights and rifle of FIG. 1 showing the off-set weapon sight of this invention on target.

Rear sight 20 includes an elongated sight body 22 and a clamping member 24. As best shown in FIGS. 1, 16 and 17, rear sight body 22 is detachably mounted at its proximal or "clamping" end to accessory rail 110 in a cantilevered fashion with its distal or "sighting" end extending laterally from weapon 100. Rear sight 20 is secured to accessory rail 110 by a clamp member 24 that is fastened to rear sight body 22 by a bolt 26. Rear sight body 22 has a recessed bottom portion 23 that forms a mounting shoe for receiving Picatinny rail 110. Clamp member 24 and rear sight body 22 have opposed contact faces 25 and 27, which abut against the inclined faces of the mounting projection 112 of rail 110 to secure the rear sight body to rail 110.

Rear sight 20 also includes a rear sight assembly that is integrally incorporated into the distal end of rear sight body 22. Rear sight assembly 30 is off-set at an angle relative to the longitudinal axis of rear sight body 22. As shown, rear sight assembly 30 is off-set at a 45 degree angle, although this off-set angle may range between 15 and 60 degrees. Rear sight assembly 30 is of conventional design and function and typical of the sight assemblies common to M16/M4 style weapons. As shown, rear sight assembly 30 includes a flip type dual leaf sight 34 mounted to a sight base 32. Sight leaf 34 has a small circular aperture 33 and a large circular aperture 35. In other embodiments, sight leaf 34 my employ a slot, notch or other opening in place of an aperture. Sight base 32 is operably mounted to an elevation knob 36, which allows for selective elevation adjustments of the rear sight assembly for ranges beyond 300 meters. In addition, rear sight assembly 30 includes a windage knob 38 mounted to sight base 32 and operatively connected to sight leaf 34 to selectively adjust the windage of the rear sight assembly. The rear sight assembly 30 uses a dual leaf sight having two different aperture sizes from which to choose: a smaller aperture 33 having a diameter of about 0.070 inch, and larger aperture 35 having a diameter of about 0.20 inch The shooter flips the sight leaf 34 to position the correct aperture into view based on the distance to the target. Generally, large aperture 35 is for targets at ranges less than 200 meters away, and small aperture 33 is for targets at ranges greater than 200 meters. Typically, large aperture 35 is also better suited for a greater field of view and faster target engagement. In other embodiments of this invention, rear sight assembly 30 may be pivotally connected to front sight body 22 and configured as a "pop-up" sight assembly, where the sight base 32 and sight leaf 34 can be selectively moved between a folded position and an operational position.

As with rear sight 20, front sight 40 includes an elongated sight body 42, and a clamping member 44. Again, front sight body 42 is detachably mounted at its proximal or "clamping" end to accessory rail 110 in a cantilevered fashion with its distal or "sighting" end extending laterally from weapon 100. Front sight 40 is secured to accessory rail 110 by clamp member 44 that is fastened to front sight body 42 by a bolt 46. Front sight body 42 has a recessed bottom portion 43 that forms a mounting shoe for receiving accessory rail 110. Clamp member 44 and front sight body 22 each have opposed contact faces 45 and 47, which abut against the inclined faces of the mounting projection 112 of rail 110 to secure the rear sight body to accessory rail 110.

Front sight 20 also includes an adjustable sight post 50, which is commonly used to provide adjustment for an initial "zero" of weapon 100. Front sight post 50 has threaded shaft 52 and terminates in a flat edge 54 that is perpendicular to the longitudinal axis of the sight post. Front sight post 50 is turned into a threaded axial bore in an integral pillar 48 that raises from the main portion of front sight body 42. Sight post 50 is again off-set at an angle relative to the longitudinal axis of front sight body 42. As shown, sight post 50 is off-set at a 45 degree angle, although this off-set angle may again range between 15 and 60 degrees. As used herein, the term "post" generally refers to and may include any front sight aiming structure, such as posts, pins, blades, and the like. In other embodiments of this invention, pillar 48 may be pivotally connected to front sight body 42 in a "pop-up" sight configuration, where the pillar and front post 50 can be selectively moved between a folded position and an operational position.

As shown in FIGS. 1, 16 and 17, both rear sight assembly 30 and front post 50 are off-set at approximately the same angle (45 degrees as shown) with respect to the longitudinal axis of the sight bodies, but also lie in a plane (designated as $C_{10}$ in the drawings). It should be noted that plane $C_{10}$ is also off-set at generally the same angle (45 degrees) from a plane (designated as $C_{100}$ in the drawings) that extends generally through both the bore axis (designated as point A in the drawings) of the weapon's barrel 106 and the center of accessory rail 110 and therefore also the line of sight (designated as point 0 in the drawings) of optical sight 130. As shown, this off-set angle is approximately 45 degrees, but may range between 15 and 60 degrees depending on the particular weapon and optical sights used in conjunction with the weapon sights of this invention. In addition, rear sight assembly 30 and front post 50 are spaced laterally from weapon 100 at a distance from the bore axis (A) of the weapon's barrel 106 approximately equal to the distance or "bore height" of a conventional M16/M4 iron sight.

FIGS. 16 and 17 illustrate the typical use of weapon sights 10 on weapon 100. When engaging targets at longer ranges, typically greater than 200 meters, the shooter assumes a traditional presentation of the weapon and orients weapon 100 so that optical sight 120 is presented on the target and the target is aligned vertically within optical plane $C_{100}$ (FIG. 16). In this position, the weapon is aimed using optical sights 130 and weapon sights 10 are spaced away from the weapon and the shooter's field of vision. When engaging targets at closer rangers, typically less than 200 meters, the shooter cants the weapon 45 degrees so that rear sight assembly 30 and front post 50 are presented on target and the target is aligned vertically within optical plane $C_{10}$ (FIG. 17). In this position, the shooter aims weapon 100 using weapon sights 10 and optical sight 120 is pivoted and spaced from the weapon and the shooter's field of vision. Using weapon sights 10, weapon 100 is properly aimed by centering horizontal top edge 54 of front sight post 50 inside either of rear sight aperture 53 and 55.

Sight bodies 22 and 42, as well as, clamping members 24 and 44 are generally machined or cast from a strong, light weight metal, such as aluminum or steel, although other suitable materials may be used. Sight bodies 22 and 42 may be configured and shaped as desired to provide the desire aesthetic appearance, while still positioning rear sight assembly 30 and front sight post 50 in the proper orientation for effectively aiming the weapon. The other components of weapon sights 10 are of conventional design and constructed of conventional materials.

Weapon sights 10 represent one embodiment of this invention in which the sight bodies 22 and 42 are secured to rail using clamping members 24 and 44. Alternative embodiments of the weapon sights of this invention may employ other attachment mechanisms for securing the front and rear sight bodies to the accessory rail or to the weapon itself. In fact, a variety of attachment mechanisms have been developed and used for such purposes and are well known in the art, such as, but not limited to, the quick release attachment mechanisms of U.S. Pat. No. 7,272,904 (LaRue).

One skilled in the art will note that the weapon sights of this invention provide certain advantages to a shooter. The weapon sights of this invention can be used in conjunction with another optical sight and mounted to the same accessory rail as the optical sight. Because the rear sight assembly and front sight post are laterally spaced from the weapon and off-set, the weapon sights of this invention do not obstruct the sight picture of the other optical sight. The cantilevered configuration and angular orientation of the rear sight assembly and the front sight post allows the shooter to transition quickly between the weapon sight of this invention and an optical sight by simply canting the weapon 45 degrees to bring the desired sight on target and into the vertical of the weapon. Using the off-set sights of this invention in conjunction with a traditional optical sight allows a shooter to engage targets at longer ranges using the primary optical sights, then quickly transition to engage targets at closer ranges using off-set iron sights.

The weapon sights of this invention are mounted directly to the accessory rail of any conventional weapon, but can be modified for use with any rail system or mounted directly to the weapon. The rear sight provides both elevation and windage adjustments and the front sight can be adjusted for the initial zero, similar to traditional M16/M4 iron sights. In addition, the weapon sights of this invention provide the same bore height as standard M4/M16A4 sights. The weapon sights can be mounted to the accessory rail on either side of the weapon to accommodate both right and left handed shooters. Because the sights' off-set position provides an uncluttered space along the length of the accessory rail, and a clear beam path, the weapon sights are compatible with military laser/illuminators. The sights also present a low profile over the accessory rail so that they do not interfere with other weapon accessories mounted to the same rail.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. Weapon sights for a weapon where the weapon includes an elongated barrel having a longitudinal bore axis, and an elongated accessory rail mounted to the weapon above the barrel and substantially parallel to the bore axis for supporting the weapon sights and a second weapon sight having a second line of sight parallel to the bore axis and spaced at a fixed selected distance above the bore axis when mounted to the accessory rail, the weapon sights comprising:

a front sight; and a rear sight used in conjunction with the front sight to aim the weapon, the front sight includes an elongated sight body having a first end and a second end, means for detachably securing the first end of the front sight body to the accessory rail so that the second end of the front sight body extends laterally from the accessory rail in a cantilevered fashion, and a front sight post [adjustably] mounted to the second end of the front sight body at an angle with respect to the longitudinal axis of the front sight body, the rear sight includes an elongated sight body having a first end and a second end, means for detachably securing the first end to the accessory rail so that the second end of the rear sight body extends laterally from the accessory rail in a cantilevered fashion, and a rear sight assembly mounted to the second end of the rear sight body at an angle with respect to the longitudinal axis of the rear sight body, the rear sight assembly having an aperture therein whereby the front sight post is viewable through the aperture for aiming the weapon along a first line of sight parallel to the bore axis and spaced from the bore axis at substantially the fixed selected distance when mounted to the accessory rail.

2. The weapon sights of claim 1 wherein the front sight post and the rear sight assembly are spaced laterally from the weapon when mounted to the accessory rail so that the front sight post and rear sight assembly lie substantially within the plane of the bore axis of the barrel.

3. The weapon sights of claim 1 wherein the front sight body has an integral sight pillar extending from the second end of the front sight body, the front sight post is insertably disposed with an axial bore within the sight pillar.

4. The weapon sights of claim 3 wherein the rear sight assembly includes a sight leaf, the aperture disposed within sight leaf.

5. The weapon sights of claim 4 wherein the rear sight includes an elevation adjustment mechanism operatively connected to the sight leaf for selectively positioning the sight leaf to adjust the aiming of the weapon for elevation changes and a windage adjustment mechanism operatively connected to the sight leaf for selectively positioning the sight leaf to adjust the aiming of the weapon for windage changes.

6. The weapon sights of claim 4 wherein the sight leaf has a second aperture therein, the sight leaf is connected to the rear sight assembly to be selectively moved between a first position whereby the front sight post is viewable through the first aperture for aiming the weapon and a second position where the front sight post is viewable through the second aperture for aiming the weapon.

7. The weapon sights of claim 1 wherein the rear sight assembly lies at a first angle between 15 and 60 degrees with respect to the longitudinal axis of the rear sight body, and the front sight post lies at a second angle between 15 and 60 degrees with respect to the longitudinal axis of the front sight body.

8. The weapon sights of claim 7 wherein the first angle and the second angle are the same, so that the front sight post and rear sight assembly lie in the same plane, when mounted to the accessory rail.

9. Weapon sights for a weapon where the weapon includes an elongated barrel having a [longitudial] *longitudinal* bore axis, the weapon also adapated to support the weapon sights and a second weapon sight having a second line of sight parallel to the bore axis and spaced at a fixed selected distance above the bore axis when mounted to the weapon, the weapon sights comprising:

a front sight; and a rear sight used in conjunction with the front sight unit to aim the weapon, the front sight includes an elongated sight body having a first end and a second end, means for detachably securing the first end of the front sight body to the weapon so that the second end of the front sight body extends laterally from the weapon in a cantilevered fashion, and a sight post [adjustably] mounted to the second end of the front sight body to lie within a plane angled with respect to the longitudinal axis of the front sight body, the rear sight includes an elongated sight body having a first end and a second end, means for detachably securing the first end to the weapon so that the second end of the rear sight body extends laterally from the weapon in a cantilevered fashion, and a rear sight assembly mounted to the second end of the rear sight body to lie within a plane angled with respect to the longitudinal axis of the rear sight body, the rear sight assembly having an aperture therein whereby the front sight post is viewable through the aperture for aiming the weapon along a first line of sight parallel to the bore axis and spaced from the bore axis at substantially the fixed selected distance when mounted to the weapon.

10. The weapon sights of claim 9 wherein the front sight post and the rear sight assembly are spaced laterally from the weapon when mounted to the weapon so that the front sight post and rear sight assembly lie substantially within the plane of the bore axis of the barrel.

11. The weapon sights of claim 9 wherein the front sight body has an integral sight pillar extending from the second end of the front sight body, the front sight post is insertably disposed with an axial bore within the sight pillar.

12. The weapon sights of claim 9 wherein the rear sight assembly includes a sight leaf, the aperture disposed within the sight leaf.

13. The weapon sights of claim 12 wherein the rear sight includes an elevation adjustment mechanism operatively connected to the sight leaf for selectively positioning the sight leaf to adjust the aiming of the weapon for elevation changes and a windage adjustment mechanism operatively connected to the sight leaf for selectively positioning the sight leaf to adjust the aiming of the weapon for windage changes.

14. The weapon sights of claim 12 wherein the sight leaf has a second aperture therein, the sight leaf is connected to the rear sight assembly to be selectively moved between a first position whereby the front sight post is viewable through the first aperture for aiming the weapon and a second position where the front sight post is viewable through the second aperture for aiming the weapon.

15. The weapon sights of claim 9 wherein the rear sight assembly lies at a first angle between 15 and 60 degrees with respect to the longitudinal axis of the rear sight body, and the front sight post lies at a second angle between 15 and 60 degrees with respect to the longitudinal axis of the front sight body.

16. The weapon sights of claim 15 wherein the first angle and the second angle are the same, so that the front sight post and rear sight assembly lie in the same plane when mounted to the weapon.

17. The weapon sights of claim 1 wherein the fixed selected distance is approximately the bore height of the iron sights on an M16.

18. The weapon sights of claim 9 wherein the fixed selected distance is approximately the bore height of the iron sights on an M16.

19. A set of alternative sights for a gun having a barrel, an accessory rail mounted above and substantially parallel to the longitudinal axis of a bore of the barrel, and a primary weapon sight with a line of sight parallel to the axis of the bore and set at a fixed distance from the axis of the bore, the set of alternative sights comprising:

a front sight and a rear sight that can be used in conjunction with the front sight to aim the weapon, the front sight and the rear sight being independently removably mountable to the accessory rail such that they are off-set at an angle of between 15 and 60 degrees from the line of sight of the primary weapon sight with a line of sight parallel to the axis of the bore and at substantially the same fixed distance from the axis of the bore as the primary weapon sight.

20. The set of alternative sights of claim 19, wherein the front sight comprises a front sight post adjustably mounted to the end of the front sight.

21. The set of alternative sights of claim 20, wherein the rear sight comprises an assembly having an aperture whereby the front sight post is viewable through the aperture for aiming the weapon along the line of sight.

22. The set of alternative sights of claim 20, wherein the front sight comprises an integral sight pillar and the front sight post is insertably disposed with an axial bore within the sight pillar.

23. The set of alternative sights of claim 21, wherein the rear sight assembly includes a sight leaf and the aperture is disposed within the sight leaf.

24. The set of alternative sights of claim 23, wherein the rear sight includes an elevation adjustment mechanism operatively connected to the sight leaf for selectively positioning the sight leaf to adjust the aiming of the weapon for elevation changes and a windage adjustment mechanism operatively connected to the sight leaf for selectively positioning the sight leaf to adjust the aiming of the weapon for windage changes.

25. The set of alternative sights of claim 24, wherein the sight leaf has a second aperture therein, the sight leaf is connected to the rear sight assembly to be selectively moved between a first position whereby the front sight post is viewable through the first aperture for aiming the weapon and a second position where the front sight post is viewable through the second aperture for aiming the weapon.

26. The set of alternative sights of claim 19, wherein the fixed distance from the axis of the bore is approximately the bore height of the iron sights on an M16.

*27. The weapon sights of claim 1 wherein the front sight post is adjustably mounted to the second end of the front sight body.*

*28. The weapon sights of claim 9 wherein the front sight post is adjustably mounted to the second end of the front sight body.*

* * * * *